United States Patent
Zhu (10) Patent No.: US 9,239,411 B2
(45) Date of Patent: Jan. 19, 2016

(54) OPTICAL FLIM, OPTICAL FILM ASSEMBLY USING THE OPTICAL FILM, AND MANUFACTURING METHOD OF THE OPTICAL FILM

(71) Applicant: Wistron Corp., New Taipei (TW)

(72) Inventor: Yan-Fei Zhu, New Taipei (TW)

(73) Assignee: WISTRON CORP., New Taipei (TW)

( * ) Notice: Subject to any disclaimer, the term of this patent is extended or adjusted under 35 U.S.C. 154(b) by 8 days.

(21) Appl. No.: 14/261,143

(22) Filed: Apr. 24, 2014

(65) Prior Publication Data

US 2015/0160383 A1    Jun. 11, 2015

(30) Foreign Application Priority Data

Dec. 9, 2013  (CN) .......................... 2013 1 0664173

(51) Int. Cl.
*G02B 27/10* (2006.01)
*G02B 5/04* (2006.01)
*F21V 8/00* (2006.01)
*B32B 37/12* (2006.01)
*B32B 38/06* (2006.01)

(52) U.S. Cl.
CPC ............ *G02B 5/045* (2013.01); *B32B 37/1207* (2013.01); *G02B 6/0053* (2013.01); *G02B 6/0088* (2013.01); *B32B 38/06* (2013.01); *B32B 2037/1253* (2013.01); *B32B 2310/0831* (2013.01); *B32B 2457/202* (2013.01)

(58) Field of Classification Search
CPC ....................................... G02B 5/045
USPC ........................................... 359/625
See application file for complete search history.

(56) References Cited

U.S. PATENT DOCUMENTS

| 2009/0116221 A1* | 5/2009 | Sato ........................ G02B 5/045 362/97.1 |
| 2010/0246021 A1 | 9/2010 | Sung |
| 2013/0010234 A1 | 1/2013 | Sung et al. |
| 2013/0095297 A1 | 4/2013 | Sung et al. |

FOREIGN PATENT DOCUMENTS

CN    103149610 A    6/2013

* cited by examiner

*Primary Examiner* — James Jones
(74) *Attorney, Agent, or Firm* — Maschoff Brennan (57) ABSTRACT

An optical film includes a substrate, several prism bars, and several connecting parts. The substrate comprises a first surface and a second surface opposite to the first surface. The prism bars are disposed on the second surface of the substrate. Each prism bar has a bottom portion and a top portion. The bottom portion of each prism bar is disposed on the second surface of the substrate, and each top portion has an edge. Each connecting part includes a flexible pillar and a connecting enlarged part. Each flexible pillar has a first end and a second end opposite to the first end. The first end of each flexible pillar is disposed on one of the edges. Each connecting enlarged part is disposed on the second end of each flexible pillar. The outer width of each connecting enlarged part is larger than that of the cross-section of each flexible pillar.

20 Claims, 6 Drawing Sheets

FIG. 6C ns
OPTICAL FLIM, OPTICAL FILM ASSEMBLY USING THE OPTICAL FILM, AND MANUFACTURING METHOD OF THE OPTICAL FILM

CROSS-REFERENCE TO RELATED APPLICATIONS

This non-provisional application claims priority under 35 U.S.C. §119(a) on Patent Application No(s). 201310664173.9 filed in China on Dec. 9, 2013, the entire contents of which are hereby incorporated by reference.

TECHNICAL FIELD

This disclosure relates to an optical film, an optical film assembly using the optical film, and a manufacturing method of the optical film, more particularly to an optical film, an optical film assembly using the optical film, and a manufacturing method of the optical film integrated with several optical films containing prism bars.

BACKGROUND

The conventional liquid crystal display (LCD) backlight module not only has light emitting diode (LED) as the light source, but also has light-guide panel, diffuser plate, prism sheet, reflector, and some other components. The manufacturers have already been developing a type of optical film with several prism bars disposed on the substrate and also integrating two optical films into one in order to achieve a thinner design on the film. When this type of optical films is to combine with other components to form an optical film assembly, connecting adhesive is usually used to connect the components. One side of the connecting adhesive connects with the prism bars of one optical film, and the other side of the connecting adhesive connects with the substrate of another optical film. Some optical equipments may adjust the effect of the light with this optical film assembly.

However, the backlight module of the LCD tends to generate heat during its operation, and the optical film assembly is then heated by the heat. Since the coefficient of thermal expansion (CTE) of the connecting adhesive and those of the different layers of the optical films are different, the change of temperature may cause deformation on the prism bars of the optical film because of the change of tension from the connecting adhesive, thereby affecting the light effect of the optical film and causing the light to be inaccurate.

SUMMARY

According to an embodiment, the optical film comprises a substrate, a plurality of prism bars, and a plurality of connecting parts. The substrate has a first surface and a second surface opposite to the first surface. The prism bar is disposed on the second surface of the substrate. Each prism bar has a bottom portion and a top portion. The bottom portion of each prism bar is disposed on the second surface of the substrate, and the top portion of each prism bar has an edge. Each connecting part comprises a flexible pillar and a connecting enlarged part. Each flexible pillar has a first end and a second end opposite to the first end, and the first end of each flexible pillar is disposed on one of the edges. Each connecting enlarged part is disposed on the second end of the flexible pillar, and the outer diameter of each connecting enlarged part is larger than the outer diameter of the cross section of each flexible pillar.

According to an embodiment, the optical film assembly comprises a first optical film, a second optical film, and a connecting adhesive. The first optical film comprises a substrate, a plurality of prism bars, and a plurality of connecting parts. The substrate has a first surface and a second surface opposite to the first surface. The prism bar is disposed on the second surface of the substrate. Each prism bar has a bottom portion and a top portion. The bottom portion of each prism bar is disposed on the second surface of the substrate, and each top portion has an edge. Each connecting part comprises a flexible pillar and a connecting enlarged part. Each flexible pillar has a first end and a second end opposite to the first end, and the first end of each flexible pillar is disposed on one of the edges. Each connecting enlarged part is disposed on the second end of the flexible pillar. The outer diameter of each connecting enlarged part is larger than the outer diameter of the cross section of each flexible pillar. The second optical film has a third surface and a fourth surface opposite to the third surface. The connecting adhesive is disposed between the connecting enlarged part of the first optical film and the third surface of the second optical film. At least a portion of each connecting enlarged part is located in the connecting adhesive, and at least a portion of each flexible pillar is located outside of the connecting adhesive.

According to an embodiment, the optical film manufacturing method comprises the following steps. A plurality of prism bars and flexible pillars are shaped on a surface of a substrate, wherein each prism bar includes a bottom portion located on the substrate and a top portion having an edge, each flexible pillar has a first end and a second end opposite to the first end, and the first end of each flexible pillar is located at one of the edges. The second end of each flexible pillar is glued with a non-solid colloid. The colloid is solidified to form a connecting enlarged part at the second end of each flexible pillar, and the outer diameter of each connect enlarged part is larger than the outer diameter of the cross section of each flexible pillar.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
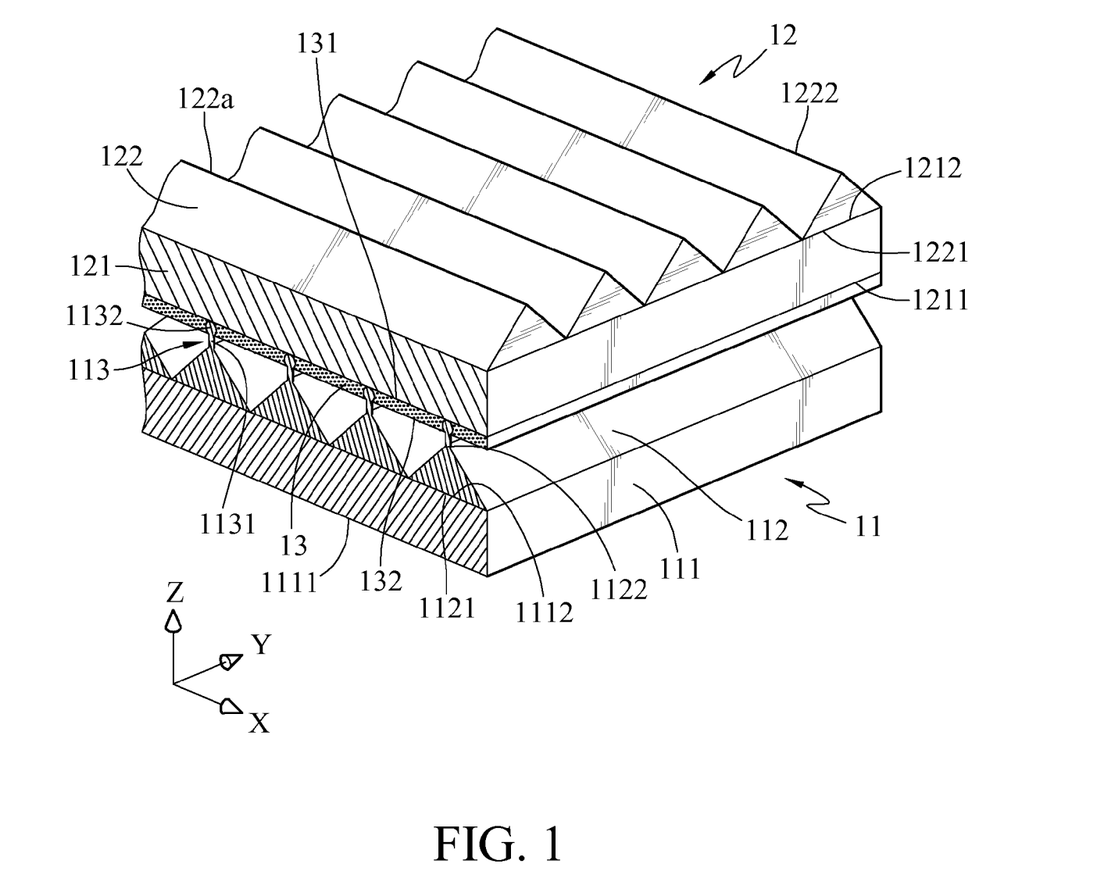
FIG. 1 is a perspective diagram of an optical film assembly in an embodiment of the disclosure.
Figure 2:
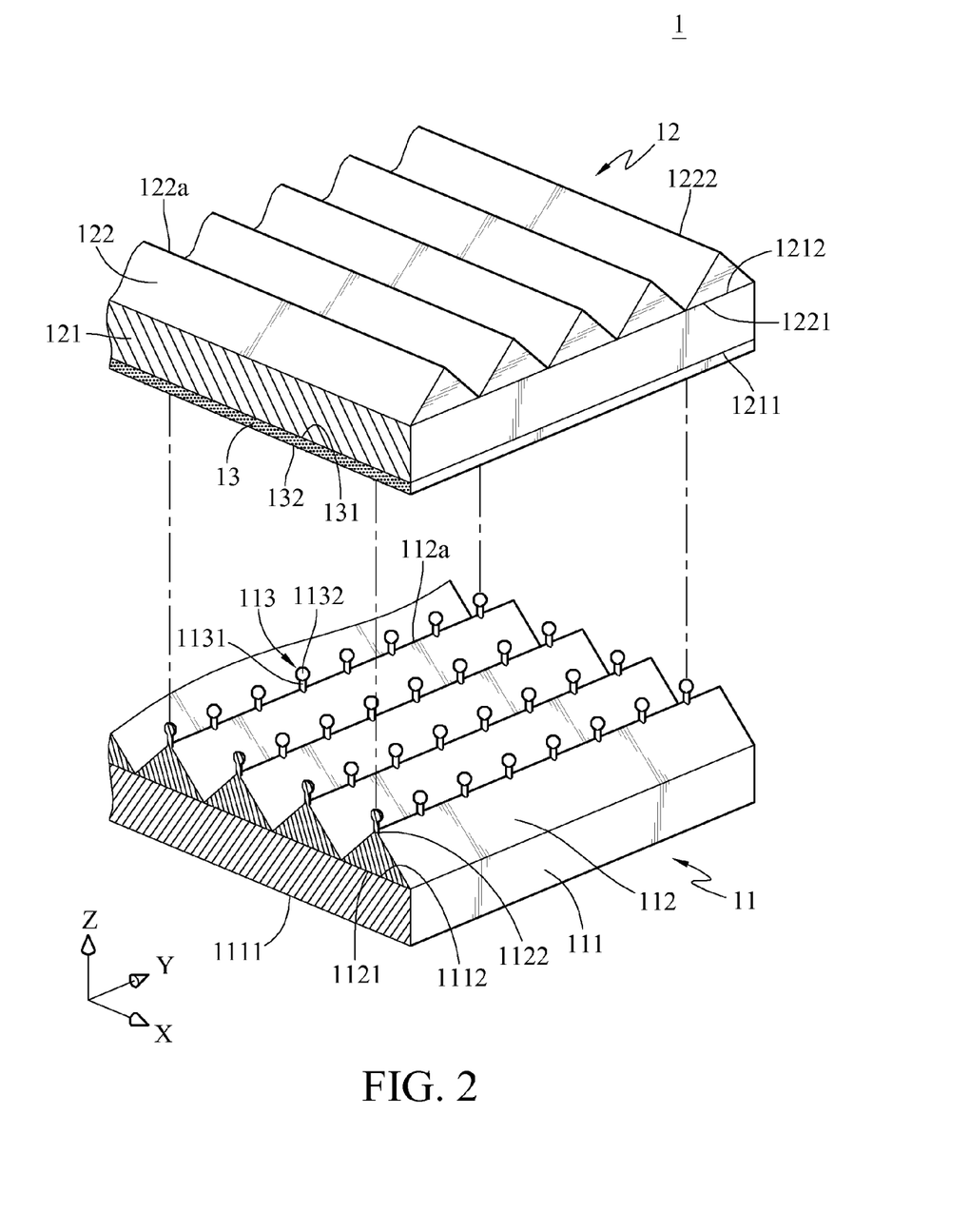
FIG. 2 is an exploded view of the optical film assembly in FIG. 1.
Figure 3:
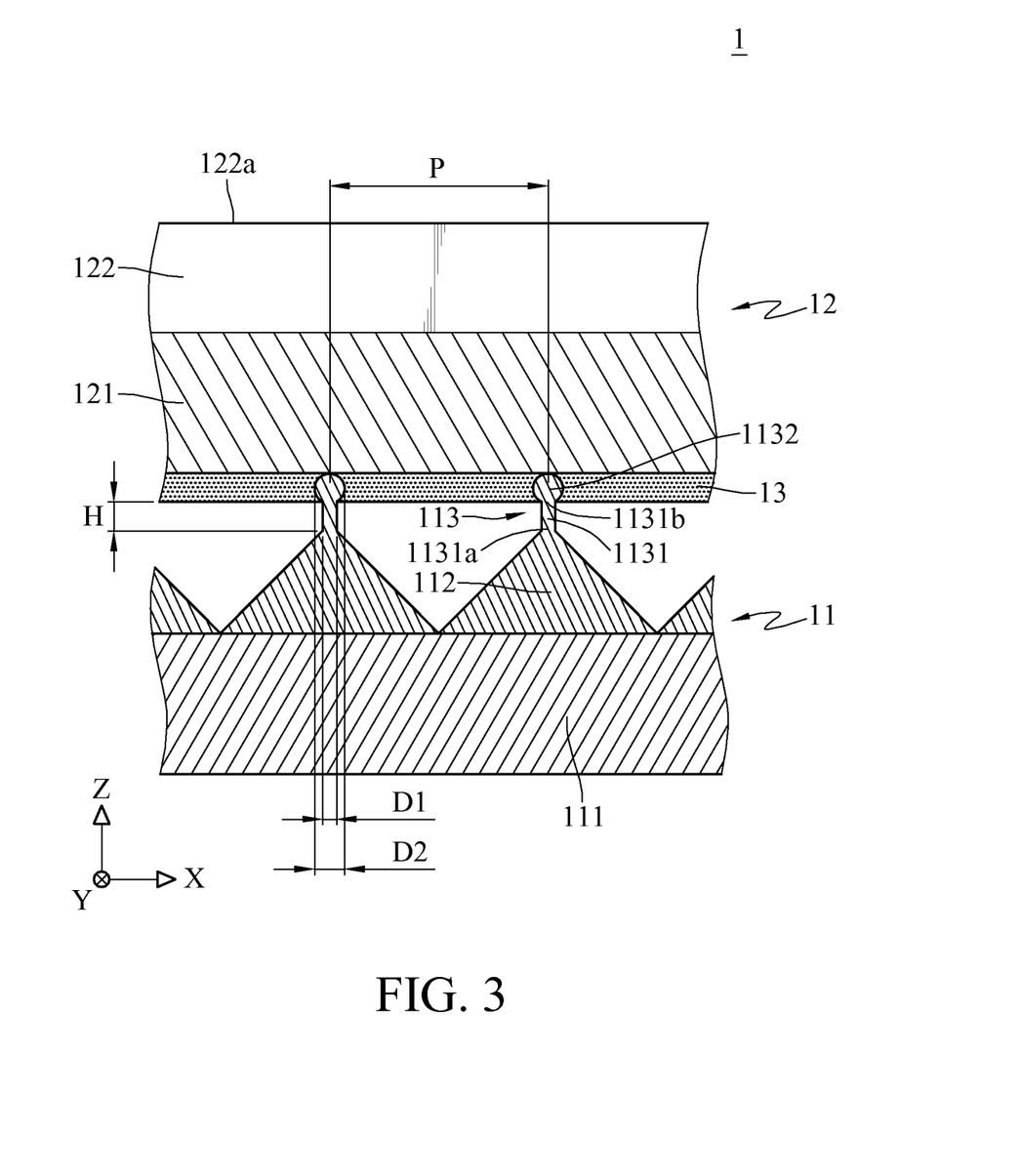
FIG. 3 is a lateral view of the optical film assembly in FIG. 1.

Referring to FIG. 1, FIG. 2, and FIG. 3, FIG. 1 is a perspective diagram of an optical film assembly in an embodiment in the disclosure; FIG. 2 is an exploded view of the optical film assembly in FIG. 1; FIG. 3 is a lateral view of the optical film assembly in FIG. 1. In the embodiment, the optical film assembly 1 comprises a first optical film 11, a second optical film 12, and a connecting adhesive 13.

The first optical film 11 comprises a first substrate 111, a plurality of first prism bars 112, and a plurality of connecting parts 113. The first substrate 111 comprises, for example, a first surface 1111 at the bottom, and a second surface 1112 at the top and opposite to the first surface 1111. The first prism bars are parallel and disposed on the second surface 1112 of the first substrate 111. Each first prism bar 112's cross section is, for example, triangle, which has a first bottom 1121 and a first top 1122. The first top 1122 has a first edge 112a. The first edge 112a may extend along the y vector in the figure. The connecting part 113 is disposed on the first edge 112a, and in this embodiment, all connecting parts 113 are disposed on the first edge 112a in a matrix arrangement. Each connecting part 113 comprises a flexible pillar 1131 and a connecting enlarged part 1132. The first end 1131a of the flexible pillar 1131 is disposed on the first edge 112a. The height of the flexible pillar 1131 is larger than the width, for example, the flexible pillar height H is 1.2 to 1.5 times the outer diameter D1 of the cross section of the flexible pillar 1131. The cross section of the flexible pillar 1131 may be circle, rectangle, hexagon, triangle, or other possible shapes. The outer diameter D1 of the cross section of the flexible pillar 1131 is smaller than the half of the distance P between the first edges 112a of the first prism bar adjacent to each other (beside). The connecting enlarged part 1132 is disposed on the second end 1131b opposite to the first end 1131a of the flexible pillar 1131. The connecting enlarged part 1132 may be a sphere, ellipse, or other possible shape if the outer diameter D2 is larger than the outer diameter D1 of the cross section of the flexible pillar 1131. The material of the connecting part 113 is pervious to light.

The second optical film 12 comprises a second substrate 121 and a plurality of second prism bars 122. The second substrate 121 comprises, for example, a third surface 1211 at the bottom and a fourth surface 1212 at the top opposite to the third surface 1211. The second prism bars 122 are parallel and disposed on the fourth surface 1212 of the second substrate 121. The cross section of each second prism bar 122 may be, for example, triangle, which has a second bottom 1221 and a second top 1222. The second top 1222 has a second edge 122a. The second edge 122a may extend along the x vector and is perpendicular to the extending direction of the first edge 112a of the first prism bar 112, but the disclosure is not limited thereto. In other embodiments, the extending direction of the second edge 122a and the extending direction of the first edge 112a are the same or with other angles.

The connecting adhesive 13 is glued between the first optical film 11 and the second optical film 12. In this embodiment, a fifth surface 131 of the connecting adhesive 13 is glued on the third surface 1211 of the second substrate 121 of the second optical film 12, while a sixth surface 132 of the connecting adhesive 13 is glued on the connecting enlarged part 1132 of the first prism bar 112 of the first optical film 11. In other words, each connecting enlarged part 1132 has at least one portion inside the connecting adhesive 13. Preferably, enlarged parts are mostly or entirely located inside the connecting adhesive 13. Each flexible pillar 1131 has at least one portion located outside of the connecting adhesive 13. Since the outer diameter D2 of the connecting enlarged part 1132 is larger than the outer diameter D1 of the cross section of the flexible pillar 1131, the area glued between the connecting enlarged part 1132 and the connecting adhesive 13 will increase.

Figure 4:
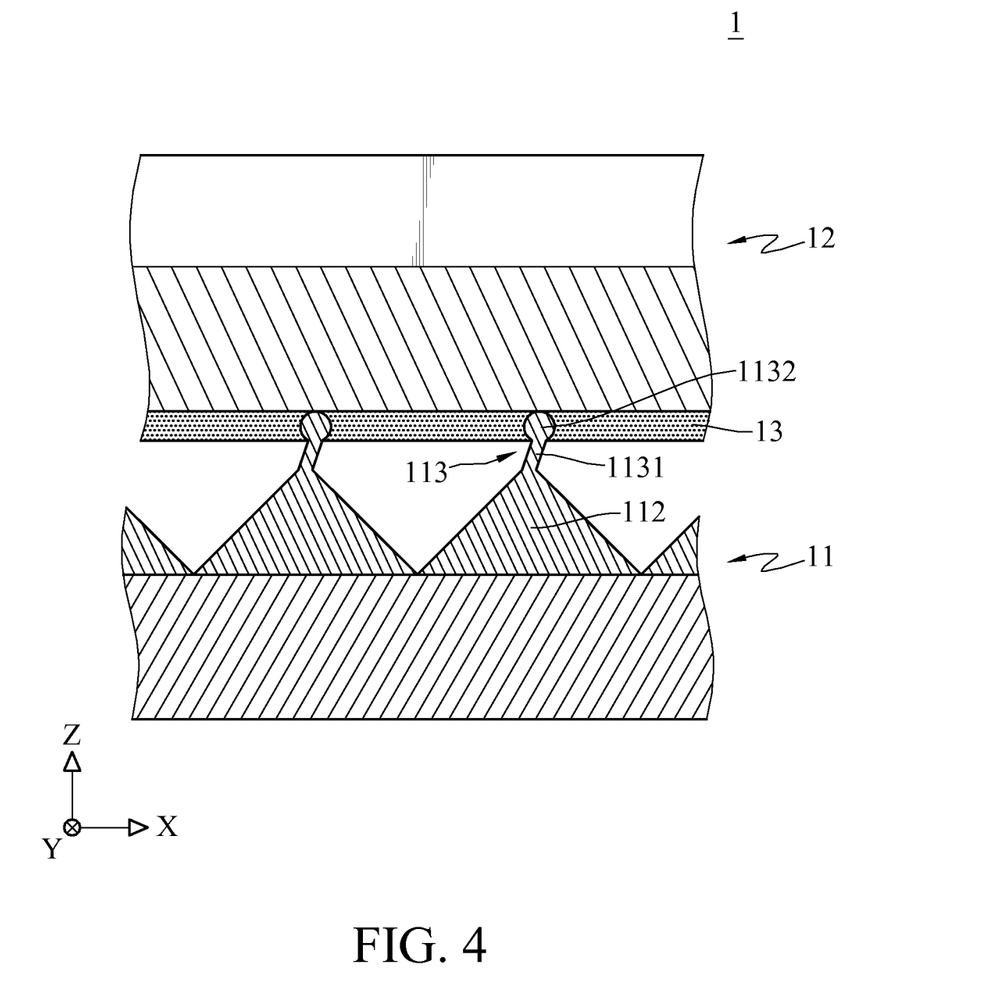
FIG. 4 is a lateral view of the optical film assembly in FIG. 1 when temperature changes.

Referring to FIG. 4, FIG. 4 is a lateral view of the optical film assembly in FIG. 1 when temperature changes, causing the location of the first optical film 11 and the second optical film 12 to be inaccurate. Since the coefficient of thermal expansion of the connecting adhesive 13, the first optical film 11, and the second optical film 12 are not the same, when the temperature around the optical film assembly 1 changes, the thermal expansion and the deformation of the connecting adhesive 13, the first optical film 11, and the second optical film 12 may be different, thereby possibly causing the dislocation of the first optical film 11 and the second optical film 12. Therefore, the connecting enlarged part 1132 of the connecting part 113 may move according to the deformation of the connecting adhesive 13. Since the flexible pillar 1131 of the connecting part 113, which is thin and high, may move flexibly, the tension from the connecting adhesive 13 pulling the first prism bar 112 may be reduced or completely avoided, thereby reducing the possibility of the first prism bar 112 being deformed.

Figure 5A:
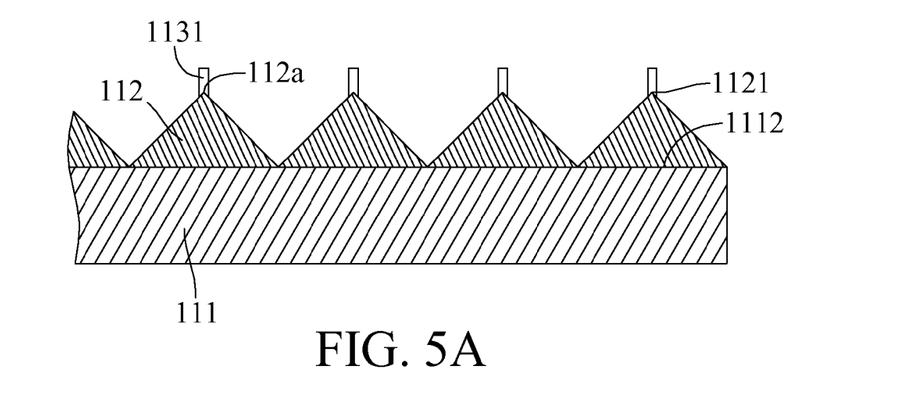
FIGS. 5A, 5B, and 5C are lateral views of the steps of manufacturing the first optical film shown in FIG. 2.
Figure 5B:
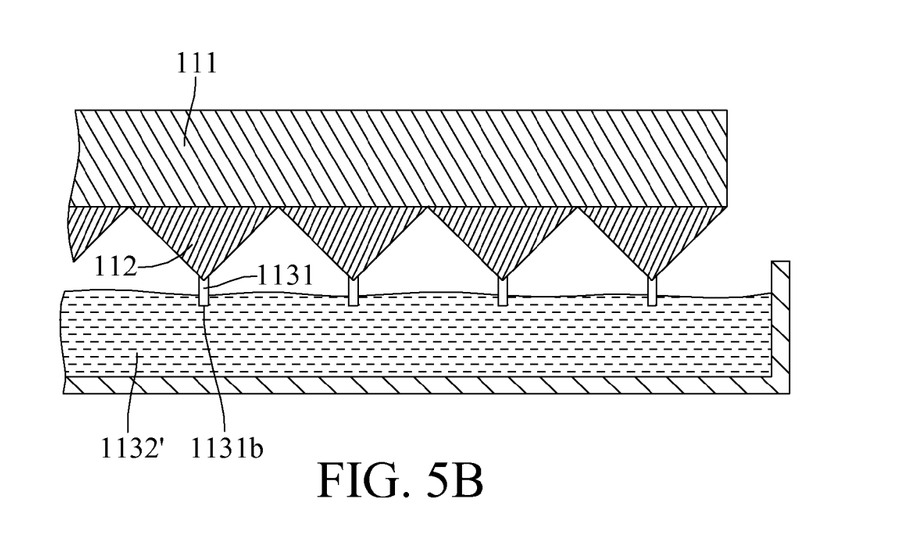
Figure 5C:
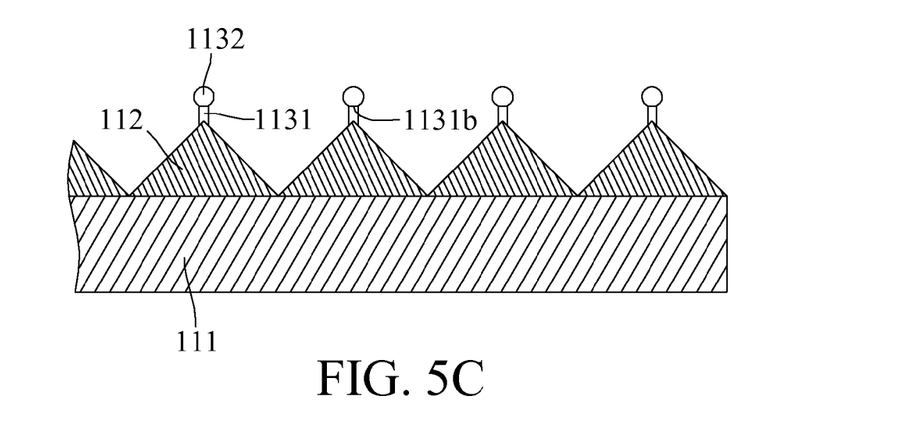

Referring to FIG. 5A, 5B, and 5C, FIGS. 5A, 5B, and 5C are lateral views of the steps of manufacturing the first optical film shown in FIG. 2. The manufacturing method of the first optical film 11 comprises the steps shown below.

As shown in FIG. 5A, the second surface 1112 of the first substrate 111 is glued to form a colloid layer. The colloid layer is pressed by a mold to solidify the colloid layer and form a first prism bar 112 and a flexible pillar 1131. In this embodiment, the mold contains the corresponding shapes of the first prism bar 112 and the flexible pillar 1131. Since the colloid layer is not solidified yet before pressed by the mold, the colloid layer may form into the corresponding shapes in the mold when being pressed by the mold. The material of the colloid layer may be pervious to light after solidification, such as ultraviolet (UV) curing adhesive or heat curing adhesive. When the colloid layer is ultraviolet curing adhesive, the solidification procedure will be to emit ultraviolet light to the colloid layer to form the first prism bar 112 and the flexible pillar 1131. When the colloid layer is heat curing adhesive, the solidification procedure will be to heat up the colloid layer to form the first prism bar 112 and the flexible pillar 1131. The top portion 1121 of the first prism bar 112 has a first edge 112a. The flexible pillar 1131 is located on the first edge 112a.

As shown in FIG. 5B, the first substrate 111 of the first prism bar 112 and the flexible pillar 1131 described above is flipped upside down so that the flexible pillar 1131 faces downward. The second end 1131b of the flexible pillar 1131 is glued with the colloid 1132' which is not yet solidified. The material of the colloid 1132' may be pervious to light after solidification, such as ultraviolet curing adhesive or heat curing adhesive.

As shown in FIG. 5C, the solidified colloid 1132' forms a plurality of connecting enlarged parts on the second end 1131b of the flexible pillar 1131. When the colloid 1132' is ultraviolet curing adhesive, the solidification procedure is to emit ultraviolet light to the colloid 1132' to form the connecting enlarged part 1132. When the colloid 1132' is heat curing adhesive, the solidification procedure is to heat up the colloid 1132' to form the connecting enlarged part 1132.

In another embodiment, the first substrate 111, the first prism bar 112, and the flexible pillar 1131 may be together as one piece to form a film. Then, the connecting enlarged part 1132 may be formed on the second end 1131b of the flexible pillar 1131, as previously described method.

Figure 6A:
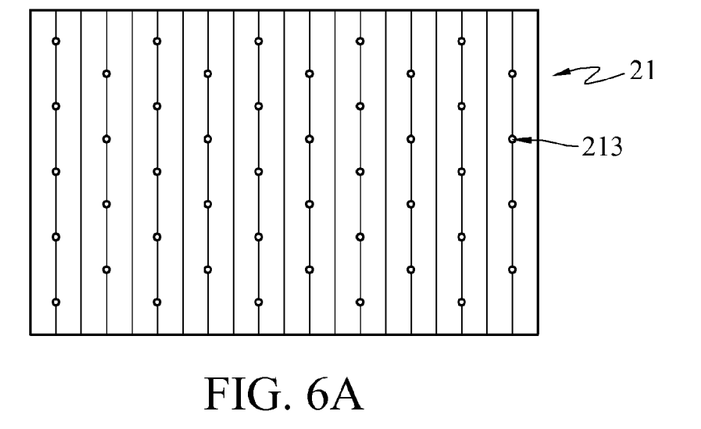
FIGS. 6A, 6B, and 6C are lateral views of the first optical film in other embodiments of the disclosure.
Figure 6B:
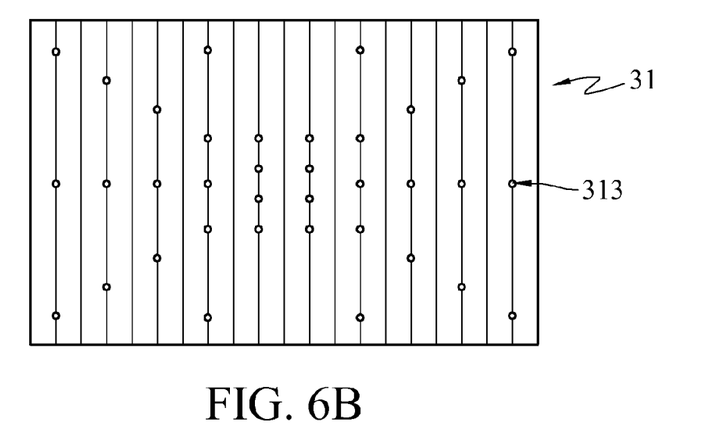
Figure 6C:
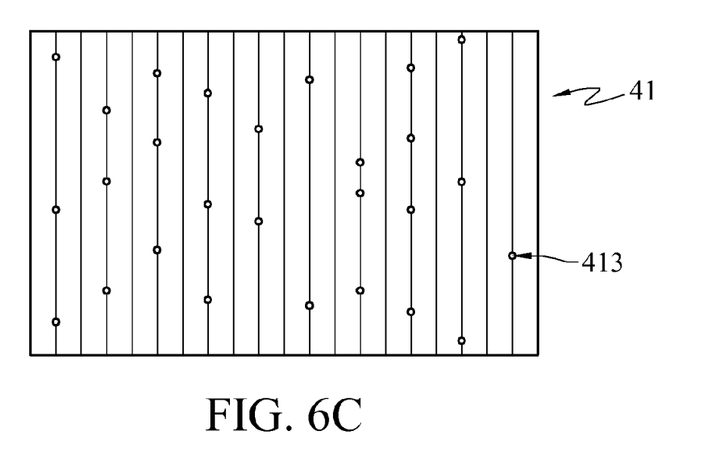

Referring to FIGS. 6A, 6B, and 6C, FIGS. 6A, 6B, and 6C are lateral views of the first optical film in other embodiments in the disclosure. As shown in FIG. 6A, in this embodiment, the connecting parts 213 of the first optical film 21 are in alternating arrangement. As shown in FIG. 6B, in this embodiment, the connecting parts 313 of the first optical film 31 are in emitting arrangement. As shown in FIG. 6C, in this embodiment, the connecting parts 413 of the first optical film 41 are in random arrangement. However, the number and the arrangement of the connecting parts 113, 213, 313, and 413 are not limited to thereto. As long as the first optical film 11, 21, 31, and 41 are securely glued with the second optical film 12 shown in FIG. 1, the number and the arrangement of the connecting parts 113, 213, 313, and 413 may be adjusted accordingly.

In summary, the present disclosure may reduce the deformation of the prism bars when the adhesive and the optical film experience different temperature transition because of the flexibility of the flexible pillar, thereby sustaining the accuracy of the light of the optical film assembly.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. An optical film, comprising:
   a substrate, comprising a first surface and a second surface opposite to the first surface;
   a plurality of prism bars, disposed on the second surface of the substrate, wherein each of the prism bars has a bottom portion and a top portion, the bottom portion of each of the prism bars is disposed on the second surface of the substrate, and each of the top portions has an edge; and
   a plurality of connecting parts, each of the connecting parts further comprising:
      a flexible pillar, having a first end and a second end opposite to the first end, wherein each of the first end of the flexible pillars is disposed on one of the edges; and
      a connecting enlarged part, disposed on the second end of the flexible pillar, wherein the outer diameter of each connecting enlarged part is larger than the outer diameter of the cross section of each flexible pillar.

2. The optical film according to claim 1, wherein the cross sectional shape of the flexible pillar is a circle, rectangle, hexagon, or triangle.

3. The optical film according to claim 1, wherein the shape of each connecting enlarged part is a sphere.

4. The optical film according to claim 1, wherein the outer diameter of the cross section of each flexible pillar is smaller than the half of the distance between the edges of the prism bars adjacent to the flexible pillar.

5. The optical film according to claim 1, wherein each flexible pillar has a pillar height, and each pillar height is larger than the outer diameter of the cross section of each flexible pillar.

6. The optical film according to claim 5, wherein each pillar height is 1.2 to 1.5 times of the outer diameter of each cross section.

7. The optical film according to claim 1, wherein the connecting parts are pervious to light.

8. An optical film assembly, comprising:
   a first optical film, comprising:
      a substrate, comprising a first surface and a second surface opposite to the first surface;
      a plurality of prism bars, disposed on the second surface of the substrate, wherein each of the prism bars has a bottom portion and a top portion, the bottom portion of each of the prism bars is disposed on the second surface of the substrate, and each of the top portions has an edge; and
      a plurality of connecting parts, each of the connecting parts further comprising:
         a flexible pillar, having a first end and a second end opposite to the first end, wherein the first end of each flexible pillar is disposed on one of the edges; and
         a connecting enlarged part, disposed on the second end of the flexible pillar, wherein the outer diameter of each connecting enlarged part is larger than the outer diameter of the cross section of each flexible pillar;
   a second optical film, having a third surface and a fourth surface opposite to the third surface; and
   a connecting adhesive, disposed between the connecting enlarged part of the first optical film and the third surface of the second optical film, wherein at least a portion of each connecting enlarged part is located in the connecting adhesive, and at least a portion of each flexible pillar is located outside of the connecting adhesive.

9. The optical film assembly according to claim 8, wherein the cross sectional shape of each flexible pillar is a circle, rectangle, hexagon, or triangle.

10. The optical film assembly according to claim 8, wherein the shape of each connecting enlarged part is a sphere.

11. The optical film assembly according to claim 8, wherein the outer diameter of the cross section of each flexible pillar is smaller than the half of the distance between the edges of the prism bars adjacent.

12. The optical film assembly according to claim 8, wherein each flexible pillar has a pillar height, and each pillar height is larger than the outer diameter of each cross section.

13. The optical film assembly according to claim 12, wherein each pillar height is 1.2 to 1.5 times of the outer diameter of each cross section.

14. The optical film assembly according to claim 8, wherein the connecting parts are pervious to light.

15. An optical film manufacturing method, comprising:
   shaping a plurality of prism bars and flexible pillars on a surface of a substrate, wherein each prism bar has a bottom portion located on the substrate and a top portion having an edge; wherein each flexible pillar has a first end and a second end opposite to the first end, the first end of each flexible pillar is located at one of the edges;
   gluing the second end of each flexible pillar with a non-solid colloid; and
   solidifying the colloid to form a connecting enlarged part at the second end of each flexible pillar, and the outer diameter of each connect enlarged part is larger than the outer diameter of the cross section of each flexible pillar.

16. The optical film manufacturing method according to claim 15, wherein the steps of forming the prism bars and the flexible pillars on one side of the substrate comprises:
   forming a colloid layer on the substrate;

molding the colloid layer to form the prism bars and the flexible pillars; and solidifying the prism bars and the flexible pillars.

17. The optical film manufacturing method according to claim 16, wherein the step of molding the colloid layer comprises pressing a mold on the colloid layer so that the colloid layer forms into the prism bars and the flexible pillars.

18. The optical film manufacturing method according to claim 15, wherein the colloid is ultraviolet (UV) curing colloid or heat curing colloid, and the step of solidifying the colloid comprises emitting UV light on the colloid or heating up the colloid.

19. The optical film manufacturing method according to claim 15, wherein each flexible pillar on the edge of each prism bar has a pillar height, and each pillar height is larger than the outer diameter of each cross section.

20. The optical film manufacturing method according to claim 15, wherein each connecting enlarged part is a sphere.

* * * * *